April 1, 1969  A. QUENOT  3,435,529

LINEAR MEASURING INSTRUMENT

Filed Nov. 21, 1966

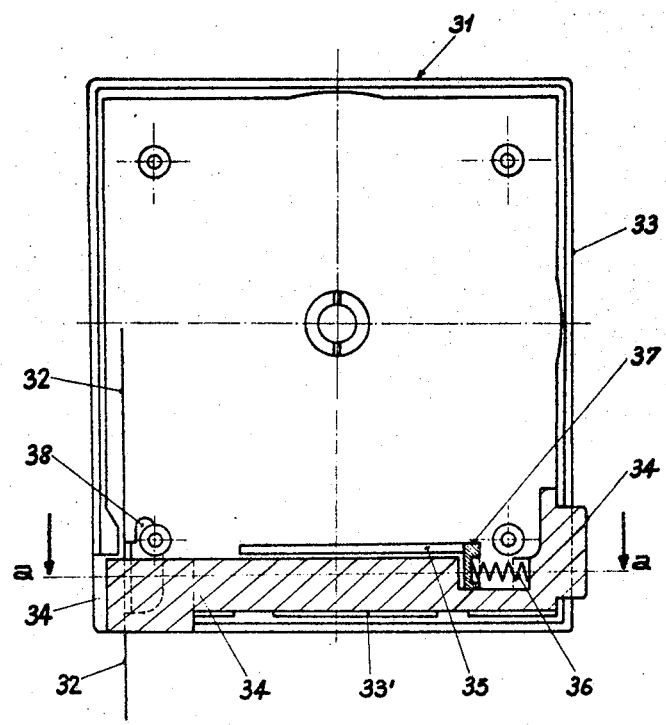
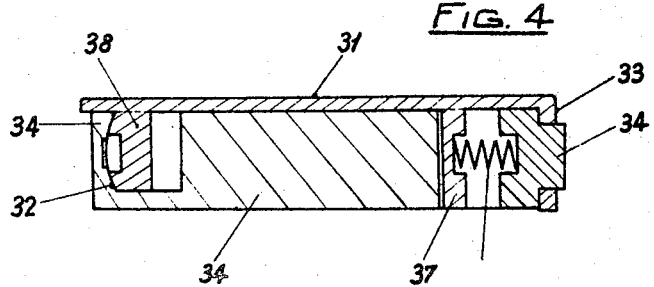

United States Patent Office 3,435,529
Patented Apr. 1, 1969

3,435,529
LINEAR MEASURING INSTRUMENT
André Quenot, Besancon, France, assignor to Quenot &
Cie S.A.R.L., Besancon, France, a French company
Filed Nov. 21, 1966, Ser. No. 595,779
Claims priority, application France, Sept. 8, 1966,
75,668
Int. Cl. G01b 3/10
U.S. Cl. 33—138                         2 Claims

ABSTRACT OF THE DISCLOSURE

In a linear measuring instrument casing, a single pivoted lever locks the tape against an inner wall of the casing and has the hook shaped end in a recess of the casing to which the pullout ring of the tape may be secured.

---

Linear measuring instruments are known having automatic return of the tape under the action of elastic means.

These means are very often used for measuring tapes of short lengths, but more rarely for instruments such as half, single or double decameter.

Certain of these instruments, single, double meter, half, single, double decameter, comprise a device or brake for locking the tape in its pulled out position.

In another known form the braking is achieved by manoeuvring manually a lever pivoting on an axle and bearing directly against the tape and causing the locking of the tape. The manipulation of such a push-button is not very convenient.

Moreover, since the lever is placed at the lower part, the measuring tape is located far from the plane in which it effects the measurements, thus leading to imprecision.

On the other hand, it is desirable to provide, at rest, when the tape is wound up at the interior of the case, the retraction of the pull-out ring and of the flanges of the end of the tape which can carry a securing hook.

It is also desirable that the device for controlling the release of the tape does not project, and for an instrument of considerable length, that the assembly of the instrument is at least one dimension of length sufficiently limited to permit the handling and grasping by the user.

Consequently, the invention proposes to remedy all these disadvantages and to provide a linear measuring instrument with automatic return of the tape to the interior of the storing case, uniquely at the instant chosen by the user, by acting on a push-button. Without exterior action the tape is constantly immobilized.

Moreover, the invention proposes to provide a system permitting the retraction, in a depression of the case, of the flanges at the end of the tape carrying the pull-out ring and possibly a hook while reducing to the minimum the cumbersomeness of the instrument.

The invention ensures moreover the maintenance of the entire end of the tape while it is in its operative position and improves the aesthetic appearance of the instrument casing.

To this end, the invention concerns a linear measuring instrument having a tape wound at the interior of a case and automatic rewinding, characterized in that the device for releasing the tape comprises a push-button guided in rectilinear displacement and acting on means for braking the tape.

The invention will be better understood by referring to the following description made by way of non-limiting example and to the accompanying drawings in which:

FIGURE 3 is an analogous view to that of FIGURE 1 for a modification.

FIGURE 4 is a view from above in section of the modification according to FIGURE 3.

Figure 1:
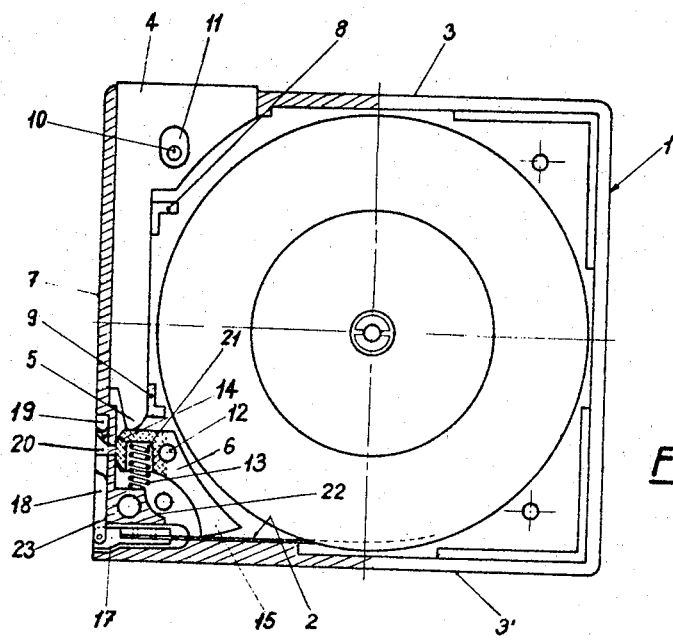
FIGURE 1 is a plan view of the instrument according to the invention for one embodiment.
Figure 2:
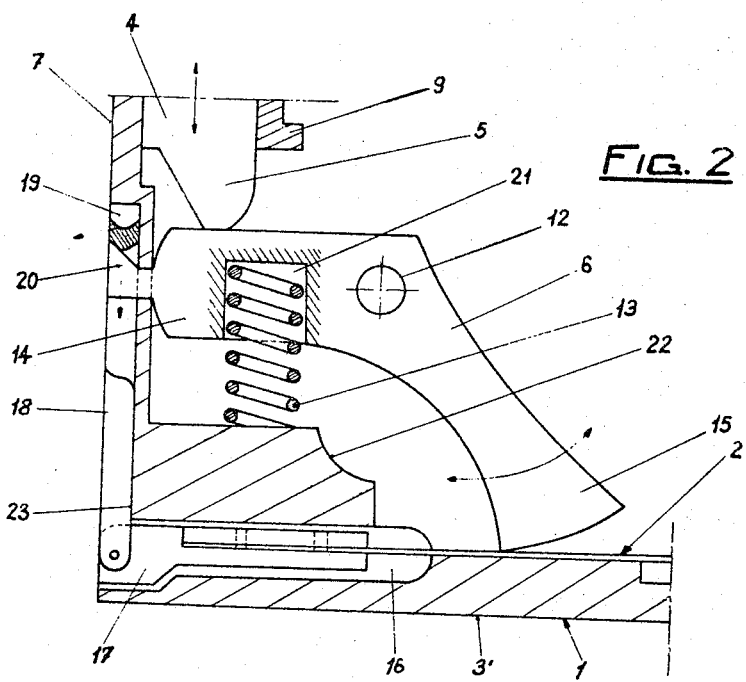
FIGURE 2 is a detail view of FIGURE 1 on an enlarged scale.

Referring first of all to FIGURES 1 and 2, the case of the instrument contains the tape 2 and on its side 3 a push-button 4 in the form of a square whose end, in the form of a beak 5, co-operates with the bent lever 6; the push-button 4 is adapted to be displaced parallel to the side 7 of the case 1, guided by the bosses 8 and 9 of the case 1. The stroke in the two directions of the push-buton 4 is limited by a cylindrical pin 10 rigid with the case 1 which acts in an oblong opening 11 of the push-button 4.

The bent lever 6 pivots about the pin 12 and, under the action of a spring 13 which pushes the end 14 against the beak 5 of the push-button 4, the tape 2 is locked between the end 15 of the bent lever 6 and the wall 3' of the case 1.

The position of the pin 12, with respect to the generatrix according to which the locking of the tape is effected, is such that by pulling on the tape, the braking tends to increase, which tends to oblige the user to release the brake to uncoil the tape.

Recess 16 receives the flanges 17 of the end of the tape 2 which carries the pull-out ring 18 which is housed in tne recess 19 of the side 7 of the case 1.

The end 14 of the lever 6 carries a hook 20 which maintains the pull-out ring 18 in its housing 19 and a cylindrical blind hole 21 in which the spring 13 is housed, the other end of which bears against the boss 22 of the case.

When one acts on the push-button 4, the tape 2 can be pulled out against the action of the return spring or can be returned to the interior by the return spring not shown. When the tape 2 is completely rewound, the end flanges 17 and the pull-out ring 18 penetrate into their housings 16 and 19 respectively, and when the action on the push-button 4 ceases, the hook 20 maintains the assembly in its rest position. To disengage the pull-out ring 18 from its rest position, it is sufficient to press the push-button 4. Under the action of the return spring, the tape 2 has a tendency to go back into the case slightly, urging the pull-out ring 18 to become disengaged from its housing 19, by bearing against the stop 23 of the said housing.

Referring now to FIGURES 3 and 4 which show a modification of the invention, the case 31 contains the tape 32 which is braked in its rest position, the control for its release being made by the face 33 of the case 31, by pressure on the push-button 34. The said push-button 34 is adapted for a rectilinear displacement and is guided between the side 33' of the case 31 and the longitudinal boss 35. The push-button 34 is under the action of a spring 36 bearing on the boss 37 of the case 31. The push-button 34 comprises two notches, one permitting the passage of the boss 37 and the housing of the spring 36, the other permitting the penetration of the boss 38 against which the tape 32 is gripped, which permits the return force of the spring 36 to be exterted according to the axis of the said push-button. The tape 32 is thus constantly gripped against the boss 38 of the case 31 and the gripping is perpendicular to the tape and has no tendency to make the tape move in or out; which is particularly advantageous for effecting an interior measurement (by adding the length of the case to the measurement read on the graduated tape at the outlet from the said case).

In this modification the push-button 34 could thus carry a hook identical to the hook 20 of FIGURES 1 and 2 and serving to immobilize a pull-out ring which would be automatically freed by pressure on the push-button 34.

Thus there is realised a simple and efficient locking system, at a relatively low cost price for it includes only the piece 34 and the spiral spring 36.

Although the invention has been described with respect to a particular embodiment, it is understood that it is not limited to that embodiment and that various modifications can be made without departing from the scope and from the spirit of the invention.

What is claimed is:

1. In a linear measuring instrument, in combination, a casing, a coiled tape wound in said casing and having a pull out ring pivoted to its outer end; an outlet in said casing for withdrawing said tape; a recess in said casing communicating with said outlet and receiving said ring therein; guides inside said casing; an elongated push-button member having a beak-shaped extremity mounted in said guides for limited movement therein; a pivoted locking lever between said extremity and said tape, said lever terminating at one end in a hook movably engaged in said recess and on which said ring may be secured within said recess; spring means urging one end of said lever against said extremity and the other end against said tape for braking the same, whereby upon depressing said push-button, said pulled out ring becomes disengaged from said hook and said tape is released.

2. Linear measuring instrument according to claim 1, wherein said elongated push-button has a slot near the end thereof remote from said beak, a pin fitting in said slot to limit sliding movement of said push-button.

References Cited

UNITED STATES PATENTS

| | | | |
|---|---|---|---|
| 748,094 | 12/1903 | Parker | 33—138 |
| 2,814,881 | 12/1957 | Ljungberg | 33—138 |
| 519,249 | 5/1894 | Farwell | 33—189 |
| 2,582,488 | 1/1952 | Kroenlein. | |

LEONARD FORMAN, *Primary Examiner.*

STEVEN L. STEPHAN, *Assistant Examiner.*

U.S. Cl. X.R.

242—107.2